US012151170B2

(12) United States Patent
Suwa et al.

(10) Patent No.: US 12,151,170 B2
(45) Date of Patent: Nov. 26, 2024

(54) INFORMATION PROCESSING DEVICE AND SERVER FOR AUTHENTICATING A GROUP OF RELATED USERS

(71) Applicant: SONY INTERACTIVE ENTERTAINMENT INC., Tokyo (JP)

(72) Inventors: Yoshihiko Suwa, Tokyo (JP); Takuya Sato, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 387 days.

(21) Appl. No.: 17/636,117

(22) PCT Filed: Sep. 10, 2020

(86) PCT No.: PCT/JP2020/034214
§ 371 (c)(1),
(2) Date: Feb. 17, 2022

(87) PCT Pub. No.: WO2021/054234
PCT Pub. Date: Mar. 25, 2021

(65) Prior Publication Data
US 2022/0288496 A1 Sep. 15, 2022

(30) Foreign Application Priority Data
Sep. 17, 2019 (JP) ................................. 2019-168523

(51) Int. Cl.
*A63F 13/79* (2014.01)
*H04L 9/40* (2022.01)

(52) U.S. Cl.
CPC .......... *A63F 13/79* (2014.09); *H04L 63/0815* (2013.01); *H04L 63/102* (2013.01)

(58) Field of Classification Search
CPC .... A63F 13/79; H04L 63/0815; H04L 63/102
See application file for complete search history.

(56) References Cited

U.S. PATENT DOCUMENTS 9,202,019 B2 * 12/2015 Xiao ........................ G06F 21/10
9,731,205 B2 * 8/2017 Sasaki ..................... H04W 4/21
(Continued)

FOREIGN PATENT DOCUMENTS

EP 3 012 765 A1 4/2016
JP 2012178747 A 9/2012
(Continued)

OTHER PUBLICATIONS

International Search Report and Written Opinion mailed Dec. 15, 2020, from PCT/JP2020/034214, 9 sheets.
(Continued)

*Primary Examiner* — Jason Chiang
(74) *Attorney, Agent, or Firm* — XSENSUS LLP

(57) ABSTRACT

A management section 122 allows a user A to sign in to a server. A user data acquiring section 136 acquires, from the server, data regarding a user B who is associated with the user A in the server but who is not yet registered in an information processing device 10. A user data holding section 138 holds data regarding the user A and the data regarding the user B that has been acquired. A login screen generation section 124 uses data held by the user data holding section 138 and displays a login screen including information regarding the user A and information regarding the user B.

5 Claims, 8 Drawing Sheets

(56) References Cited

U.S. PATENT DOCUMENTS

| | | | | |
|---|---|---|---|---|
| 11,123,641 | B2* | 9/2021 | Asanuma | H04N 21/4532 |
| 2005/0144297 | A1* | 6/2005 | Dahlstrom | H04L 63/101 |
| | | | | 709/229 |
| 2005/0210395 | A1* | 9/2005 | Wakita | G06F 21/6245 |
| | | | | 715/753 |
| 2005/0262132 | A1* | 11/2005 | Morita | G06F 21/6218 |
| | | | | 707/999.102 |
| 2009/0077217 | A1* | 3/2009 | McFarland | G06Q 10/06 |
| | | | | 709/223 |
| 2013/0116032 | A1* | 5/2013 | Lutnick | G07F 17/32 |
| | | | | 463/25 |
| 2013/0173530 | A1* | 7/2013 | Laron | G06F 16/176 |
| | | | | 707/608 |
| 2013/0198834 | A1* | 8/2013 | Kirsch | H04L 63/12 |
| | | | | 726/17 |
| 2014/0074972 | A1* | 3/2014 | Togashi | H04L 67/06 |
| | | | | 709/217 |
| 2015/0058973 | A1* | 2/2015 | Haberman | G06F 21/36 |
| | | | | 726/19 |
| 2015/0113434 | A1* | 4/2015 | Lineberger | G06Q 30/0269 |
| | | | | 715/751 |
| 2015/0194014 | A1* | 7/2015 | Gibson | G06Q 30/02 |
| | | | | 463/25 |
| 2015/0381571 | A1* | 12/2015 | Plasse | H04L 51/046 |
| | | | | 726/26 |
| 2016/0008720 | A1* | 1/2016 | Inukai | A63F 13/352 |
| | | | | 463/29 |
| 2016/0112357 | A1* | 4/2016 | Lineberger | H04L 67/306 |
| | | | | 709/204 |
| 2016/0112399 | A1* | 4/2016 | Ogawa | H04L 9/3226 |
| | | | | 726/5 |
| 2016/0139752 | A1* | 5/2016 | Shim | G06F 3/04817 |
| | | | | 715/771 |
| 2016/0236095 | A1* | 8/2016 | Joo | A63F 13/537 |
| 2016/0301675 | A1* | 10/2016 | Wiles | A63F 13/73 |
| 2017/0171334 | A1* | 6/2017 | Li | H04L 67/54 |
| 2017/0209790 | A1* | 7/2017 | Nomura | A63F 13/86 |
| 2017/0209791 | A1* | 7/2017 | Nomura | G06F 13/4282 |
| 2018/0114454 | A1* | 4/2018 | Rajabian | G09B 7/00 |
| 2018/0193741 | A1* | 7/2018 | Kiwada | A63F 13/335 |
| 2018/0193753 | A1* | 7/2018 | Kiwada | A63F 13/795 |
| 2019/0022533 | A1* | 1/2019 | Asanuma | H04N 21/4532 |
| 2019/0044896 | A1* | 2/2019 | Sherkin | H04L 9/0891 |
| 2019/0163931 | A1* | 5/2019 | Wolverton | G06F 21/6245 |
| 2019/0225336 | A1 | 7/2019 | Myslinski | |
| 2019/0321732 | A1* | 10/2019 | Zimring | A63F 13/355 |
| 2022/0159319 | A1* | 5/2022 | Wang | H04N 21/2353 |
| 2022/0166633 | A1* | 5/2022 | Whittaker | G06F 21/1083 |

FOREIGN PATENT DOCUMENTS

| | | |
|---|---|---|
| JP | 2015005226 A | 1/2015 |
| JP | 2015114941 A | 6/2015 |
| JP | 2018183919 A | 11/2018 |
| WO | 2019/021888 A1 | 1/2019 |

OTHER PUBLICATIONS

Notice of Reasons for Refusal drafted Oct. 25, 2022, from Japanese Patent Application No. 2021-546637, 3 sheets.
European Search Report issued Sep. 25, 2023, in corresponding EP Application 20866774.1, 7pp.

* cited by examiner

FIG.4
(a)
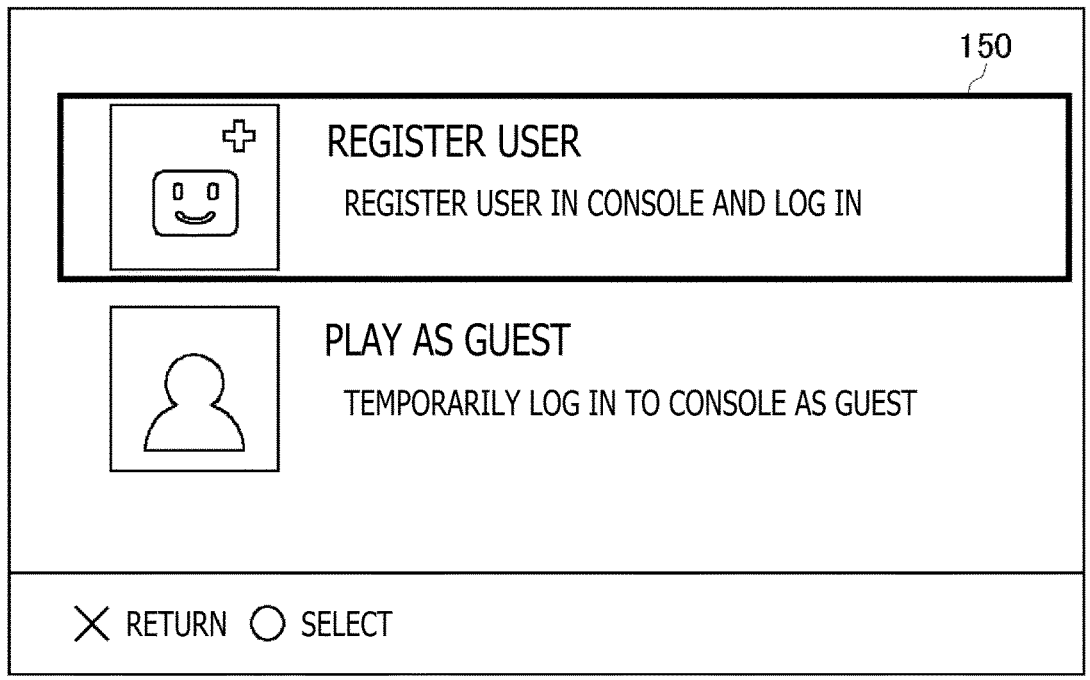
(b)
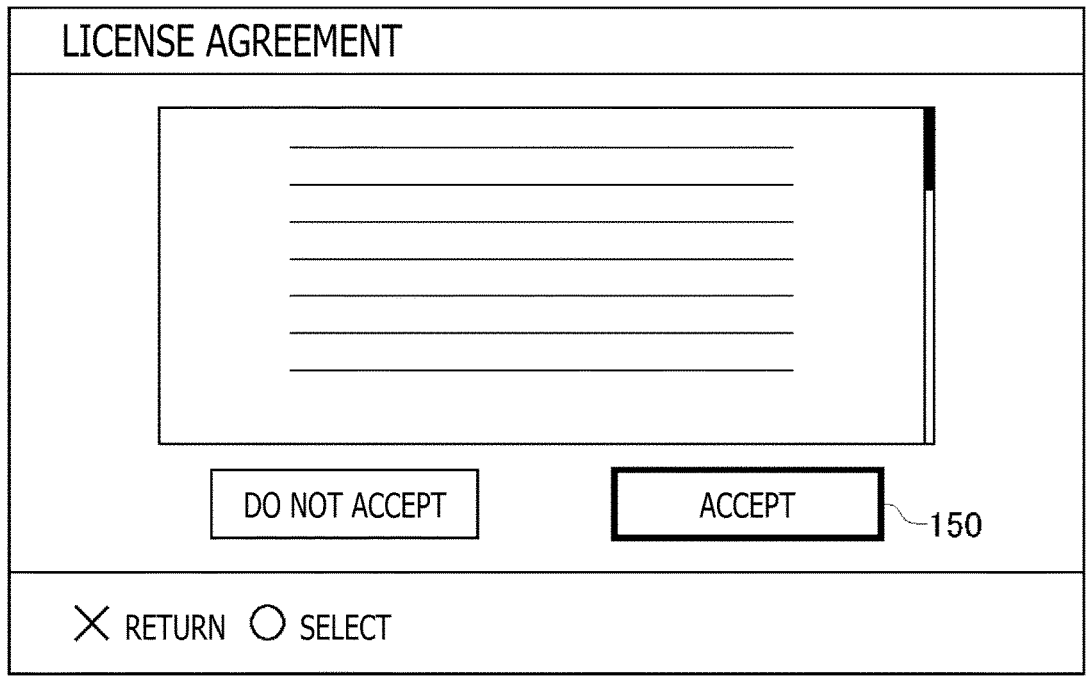

| REGISTER USER |
|---|

YOU CAN CREATE ACCOUNT OR
USE ACCOUNT YOU ALREADY HAVE

[ SKIP ]   [ NEXT ] ~150

✕ RETURN  ◯ SELECT

<u>4</u>

(b)

| SIGN IN TO NETWORK SERVICE |
|---|

SIGN-IN ID (E-MAIL ADDRESS)
aaa@bbb.ccc

PASSWORD
******

[ SIGN IN ] ~150

[ FIRST TIME TO USE NETWORK SERVICE? CREATE ACCOUNT ]

✕ RETURN  ◯ SELECT

<u>4</u>

FIG.7
REGISTER FAMILY MEMBER USER
THERE IS FAMILY MEMBER WHO HAS NOT YET BEEN REGISTERED IN CONSOLE. REGISTER NOW?
☑ ONLINE ID OF USER B
☑ ONLINE ID OF USER C
[ SKIP ]   [ REGISTER ] ~150
✕ RETURN   ◯ SELECT
FIG.8
🎮 GAME CONTROLLER HAS BEEN CONNECTED. WHO WILL USE CONTROLLER?
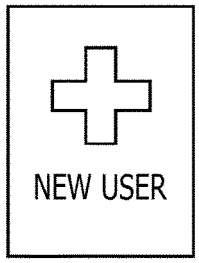 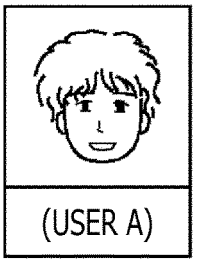 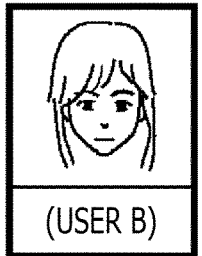 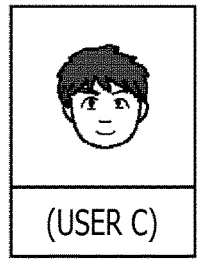
NEW USER | (USER A) | (USER B) | (USER C)
150
✕ CANCEL   ◯ SELECT

FIG. 9

| SIGN IN TO NETWORK SERVICE |
|---|

SIGN-IN ID (E-MAIL ADDRESS)

ddd.@mmm.nnn

PASSWORD

[                    ] ~150

SIGN IN

FIRST TIME TO USE NETWORK SERVICE? CREATE ACCOUNT

✕ RETURN   ○ SELECT

<u>4</u>

INFORMATION PROCESSING DEVICE AND SERVER FOR AUTHENTICATING A GROUP OF RELATED USERS

TECHNICAL FIELD

The present invention relates to a technology for allowing a user to log in to an information processing device.

BACKGROUND ART

PTL 1 discloses an information processing system in which an information processing device which is a game device connects to a server via the internet. By registering his/her network account in the information processing device and signing in to the server, a user can use the network service provided by the server. The server manages various kinds of data such as a user icon and an online identification (ID) by associating them with a sign-in ID constituting the network account of the user.

In a case where a user who already has a network account renews his/her information processing device and logs in to the new information processing device for the first time, an input screen based on a predetermined registration procedure is displayed on the display. In PTL 1, when the user accepts the details of the agreement on an acceptance screen for a license agreement, the user is given a local account and logs in to the information processing device. In PTL 1, in the registration screen for the network account that is displayed next, by inputting a sign-in ID (e-mail address) and a sign-in password that are already registered in the server, for example, the user is authenticated by the server and signs in to the server. When the user signs in to the server for the first time from the new information processing device, the server transmits, to the information processing device, various kinds of data associated with the sign-in ID, such as the user icon and online ID.

PTL 2 discloses a method of forming a family group to which members of a family belong. Members belonging to the family group are classified as an adult or a child by age, and a family manager can change setting information regarding parental control for the child. Member information regarding the family group is managed by the server.

CITATION LIST

Patent Literature

[PTL 1]
Japanese Patent Laid-open No. 2015-5226
[PTL 2]
PCT Patent Publication No. WO2019/021888

SUMMARY

Technical Problem

As disclosed in PTL 1, a user who already has a network account and has purchased a new information processing device is required to perform work based on a predetermined registration procedure, in order to register himself/herself in the relevant information processing device. Though this work for new registration is simplified, it is obviously time-consuming. As such, there are demands for creation of a mechanism for reducing the time and effort taken for the new registration work.

Solution to Problem

In order to solve the abovementioned problem, one mode of the present invention resides in an information processing device that connects to a server, the information processing device including a management section, a user data acquiring section, a user data holding section, and a login screen generation section. The management section allows a first user to sign in to the server. The user data acquiring section acquires, from the server, data regarding a second user who is associated with the first user in the server but who is not yet registered in the information processing device. The user data holding section holds data regarding the first user and the data regarding the second user that is acquired from the user data acquiring section. The login screen generation section displays a login screen including information regarding the first user and information regarding the second user, by using the data held in the user data holding section.

Another mode of the present invention resides in a server that connects to an information processing device, the server including a group information holding section, a user specifying section, and a transmission section. The group information holding section holds group information in which plural users are associated with each other. The user specifying section refers to the group information held by the group information holding section and specifies a different user associated with a user who has already signed in to the server. The transmission section transmits, to the information processing device, login data of the different user.

It is to be noted that any combination of the abovementioned components and conversion of the expressions of the present invention between, for example, methods, devices, systems, recording media, and computer programs are also effective as the mode of the present invention.

BRIEF DESCRIPTION OF DRAWINGS

FIG. 4 depicts diagrams illustrating input screens used in a registration procedure.

FIG. 5 depicts diagrams illustrating input screens used in the registration procedure.

FIG. 7 is a diagram illustrating a registration screen for a family member.

FIG. 8 is a diagram illustrating an example of a login screen.

FIG. 9 is a diagram illustrating an input screen for account information.

DESCRIPTION OF EMBODIMENT

Figure 1:
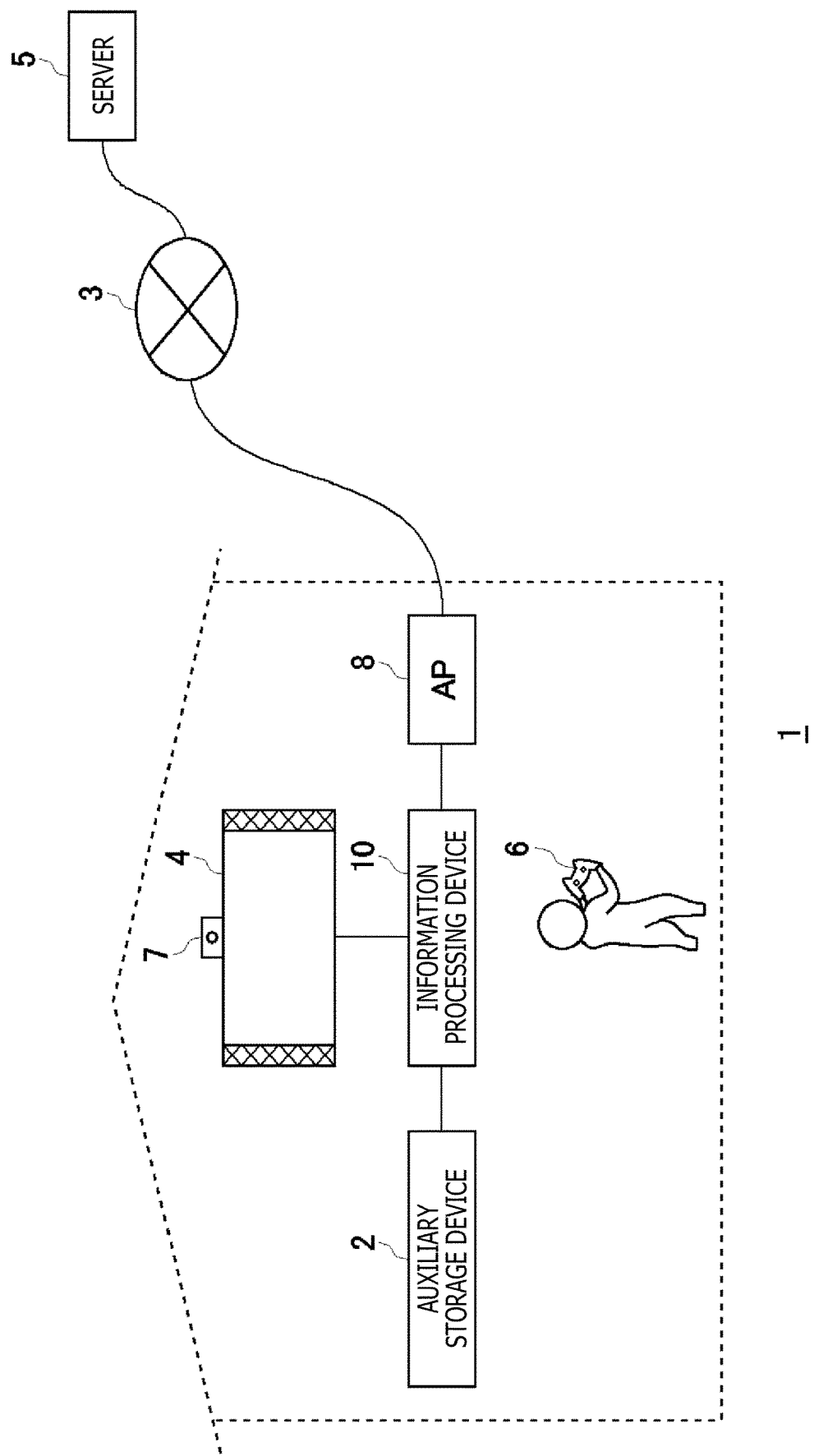
FIG. 1 is a diagram illustrating an information processing system according to an embodiment.

FIG. 1 illustrates an information processing system 1 according to an embodiment of the present invention. The information processing system 1 includes an information processing device 10 which is a user terminal and a server 5. An access point (hereinafter referred to as an "AP") 8 has functions of a wireless access point and a router, and the information processing device 10 connects to the AP 8 in a wireless or wired manner and to the server 5 on a network 3 in such a manner that communication is available between the information processing device 10 and the server 5.

An auxiliary storage device 2 is a large-capacity storage device such as a hard disk drive (HDD) or a solid state drive (SSD) and may be a built-in storage device or an external storage device that connects to the information processing device 10 through a universal serial bus (USB), for example. An output device 4 may be a television set that includes a display that outputs images and a speaker that outputs sound.

The information processing device 10 is connected, in a wireless or wired manner, to an input device 6 that is operated by a user, and the input device 6 outputs, to the information processing device 10, an operation signal indicating the result of an operation made by the user. Upon receiving the operation signal from the input device 6, the information processing device 10 reflects the operation signal in processing in system software or an application and causes the output device 4 to output the result of processing.

In the information processing system 1, the information processing device 10 may be a game device for executing a game, and the input device 6 may be a device, such as a game controller, that provides, to the information processing device 10, the operation signal from the user. A camera 7 which is an imaging device is provided in the proximity of the output device 4, and images a space around the output device 4. The camera 7 may be a stereo camera.

In the information processing system 1, the server 5 provides the user with a network service related to a game. The server 5 manages account information for identifying a user, and the user uses the account information to sign in to the server 5 and use the network service. It is to be noted that, in the following description, signing in to the server 5 is sometimes simply referred to as signing in to the network service.

The account information may include a sign-in ID (e-mail address) and a sign-in password. By registering the sign-in ID and password in the server 5, the user acquires a network account which represents a right to use the network service.

When the user logs in to the information processing device 10 in which the user has registered his/her account information, the account information is authenticated by the server 5, making it possible for the user to automatically sign in to the server 5. Here, the user's act of logging in to the information processing device 10 means that the user becomes able to use the functions of the information processing device 10, while the user's act of signing in to the server 5 means that the user becomes able to use the network service. By signing in to the server 5, the user can store, in the server 5, save data regarding a game and register, in the server 5, any prize (trophy) the user has won during the game play.

Figure 2:
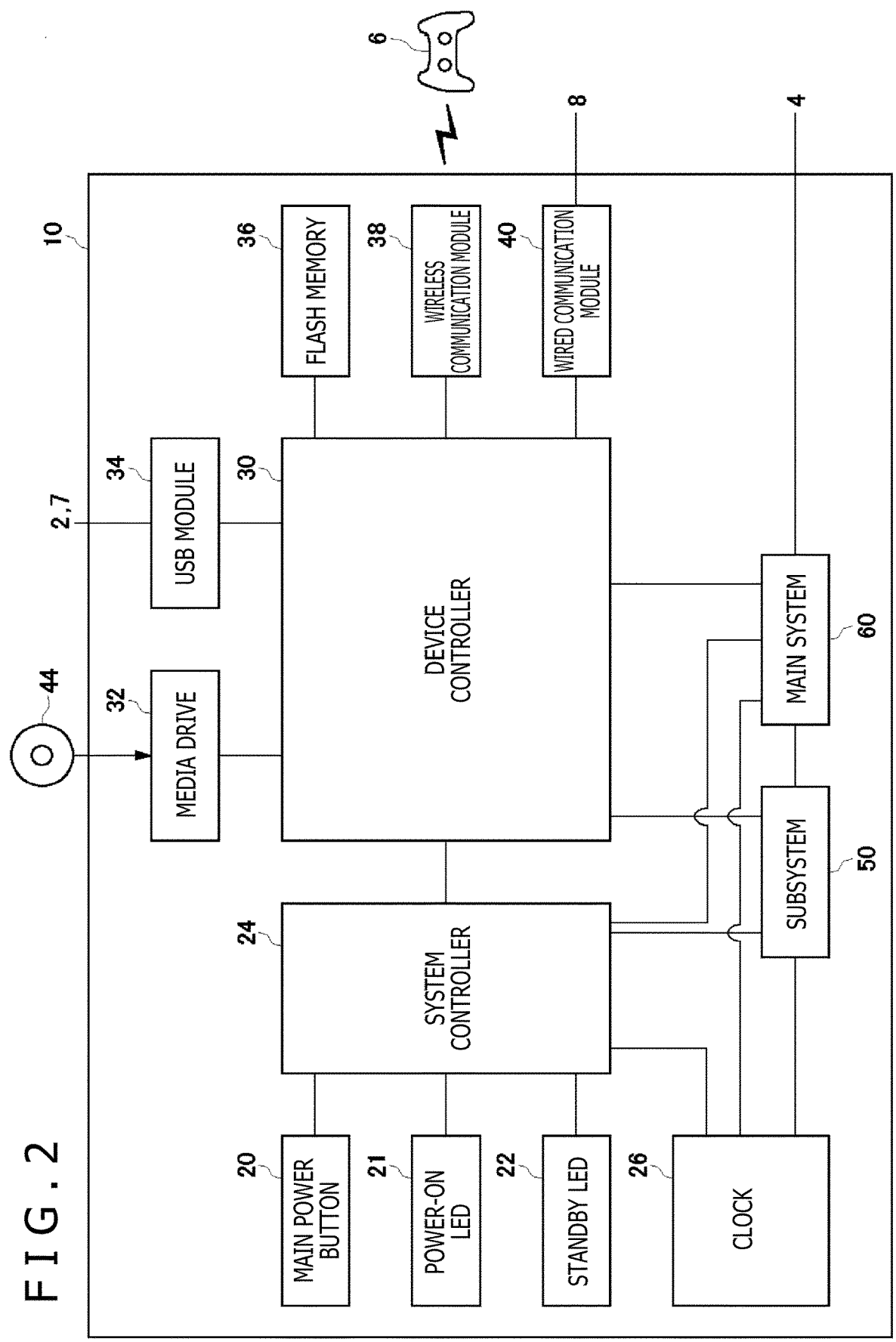
FIG. 2 is a diagram illustrating a hardware configuration of an information processing device.

FIG. 2 illustrates a hardware configuration of the information processing device 10. The information processing device 10 includes a main power button 20, a power-ON light emitting diode (LED) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main central processing unit (CPU), a memory and a memory controller that serve as a main storage device, a graphics processing unit (GPU), and the like. The GPU is mainly used for operational processing for a game program. These functions may be configured as a system-on-chip and formed on a single chip. The main CPU has a function of executing a game program recorded in the auxiliary storage device 2 or a read only memory (ROM) medium 44.

The subsystem 50 includes a sub CPU, a memory and a memory controller that serve as a main storage device, and the like but neither includes a GPU nor has a function of executing a game program. The number of circuit gates of the sub CPU is smaller than the number of circuit gates of the main CPU, and the operation power consumption of the sub CPU is smaller than the operation power consumption of the main CPU.

The main power button 20 is an input section into which input of an operation is made by the user. The main power button 20 is provided on a front surface of a housing of the information processing device 10 and is operated to turn on or off power supply to the main system 60 of the information processing device 10. The power-ON LED 21 is lit when the main power button 20 is turned on, while the standby LED 22 is lit when the main power button 20 is turned off.

The system controller 24 detects any pressing down of the main power button 20 by the user. If the main power button 20 is pressed down when the main power supply is in an OFF state, the system controller 24 acquires such a pressing-down operation as a "turn on instruction." On the other hand, if the main power button 20 is pressed down when the main power supply is in an ON state, the system controller 24 acquires such a pressing-down operation as a "turn off instruction."

The clock 26 is a real-time clock, generates information regarding current date and time, and supplies such information to the system controller 24, the subsystem 50, and the main system 60. The device controller 30 is configured as a large-scale integrated circuit (LSI) that executes exchange of information between devices, similarly to a south bridge. As illustrated in the drawing, the device controller 30 is connected to such devices as the system controller 24, the media drive 32, the USB module 34, the flash memory 36, the wireless communication module 38, the wired communication module 40, the subsystem 50, and the main system 60. The device controller 30 absorbs a difference in electric characteristics and a difference in data transfer speed between the devices, and controls timing of data transfer.

The media drive 32 is driven with the ROM medium 44 attached thereto and is a drive device that reads out programs, data, and the like from the ROM medium 44. The ROM medium 44 has application software such as a game and license information recorded therein. The ROM medium 44 may be a read only recording medium such an optical disk, a magneto-optical disk, and a Blu-ray disc.

The USB module 34 is a module connected to an external device through a USB cable. The USB module 34 may be connected to the auxiliary storage device 2 and the camera 7 through a USB cable. The flash memory 36 is an auxiliary storage device that configures an internal storage. The wireless communication module 38 is a communication protocol such as a Bluetooth (registered trademark) protocol or an Institute of Electrical and Electronics Engineering (IEEE) 802.11 protocol, and, for example, performs wireless communication with the input device 6. The wired communication module 40 performs wired communication with an external device and connects to the network 3 through the AP 8.

Figure 3:
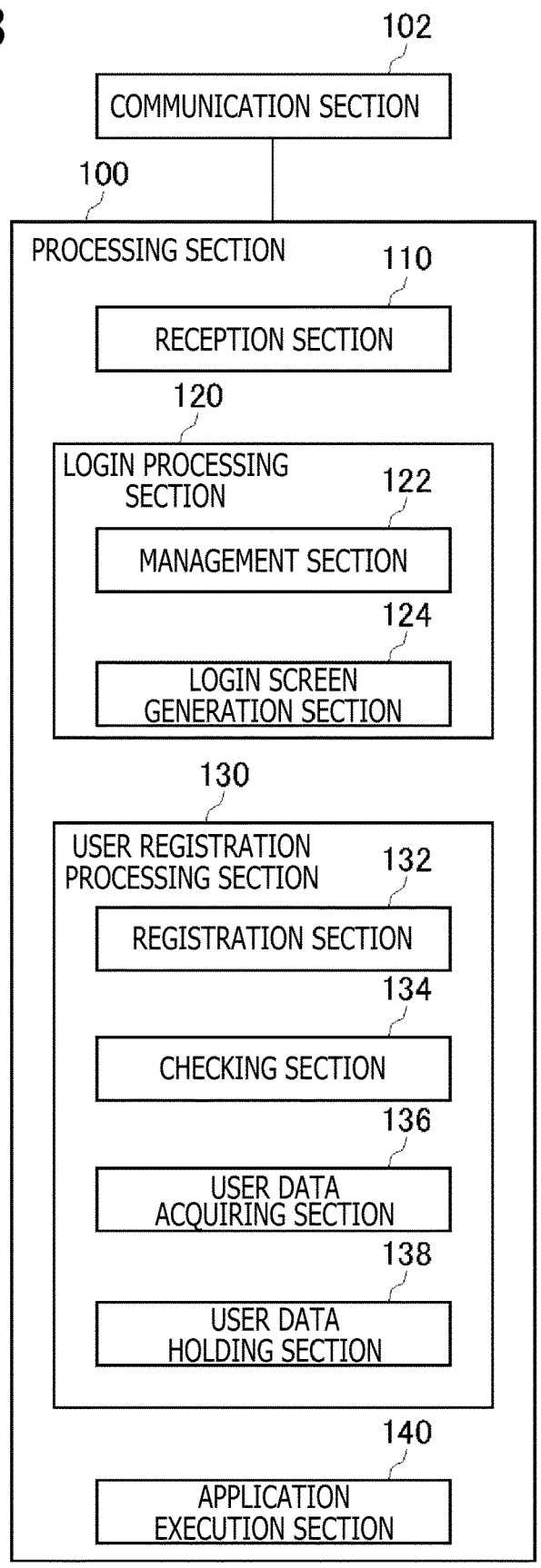
FIG. 3 is a diagram illustrating functional blocks of the information processing device.

FIG. 3 illustrates functional blocks of the information processing device 10. The information processing device 10 includes a processing section 100 and a communication section 102. The processing section 100 includes a reception section 110, a login processing section 120, a user registration processing section 130, and an application execution section 140. The login processing section 120 includes a management section 122 and a login screen generation section 124. The user registration processing section 130 has a registration section 132, a checking section 134, a user data acquiring section 136, and a user data holding section 138. The communication section 102 includes the wireless communication module 38 and the wired communication module 40 that are illustrated in FIG. 2, and the user data holding section 138 may include the flash memory 36.

In FIG. 3, components described as functional blocks that perform various kinds of processing may be configured by a circuit block, a memory, or any other LSI, in terms of hardware, or may be implemented, for example, by a program loaded to a memory, in terms of software. Thus, it should be understood by those skilled in the art that these functional blocks can be implemented in various ways including hardware only, software only, or a composite configuration of the two; the way of implementing them is not limited to any of them.

In the following description, a procedure by which a user A and a user B log in to the information processing device 10 will be described. The user A and the user B both have network accounts. The information processing device 10 is a game device (game console) that has just been newly purchased. Both the user A and the user B have not yet registered their user data in the information processing device 10.

An outline of the present disclosure will be explained. When the user A logs in to the information processing device 10 by following the conventional new registration procedure and signs in to the server 5, the information processing device 10 acquires login data of the user B from the server 5. In order to acquire the login data of the user B upon the user A's act of signing in to the server 5, the user B needs to be a user associated with the user A in the server 5. For example, in a case where the user A and the user B are registered in the server 5 as members of the family group disclosed in PTL 2, the information processing device 10 may acquire the data regarding user B upon the user A's act of signing in to the server 5. By acquiring data necessary for the user B to log in to the information processing device 10 before the user B logs in to the information processing device 10 for the first time, the information processing device 10 allows the user B to easily log in to the information processing device 10 without performing any work based on the new registration procedure at the time of operating the information processing device 10 for the first time.

First, the process in which the user A registers himself/herself in the information processing device 10 is explained. In the user registration processing section 130, the registration section 132 displays, on the output device 4, an input screen based on the new registration procedure.

FIG. 4(a) illustrates an initial input screen. In the initial input screen, the user A sets a selection frame 150 to a display region indicating "Register user" and operates a select button of the input device 6. When the reception section 110 receives an operation of the select button and supplies operation information to the registration section 132, the registration section 132 displays, on the output device 4, an acceptance screen for a license agreement. It is to be noted that, when the user A sets the selection frame 150 to a display region indicating "Play as guest" and operates the select button of the input device 6, the user A logs in as a guest to the information processing device 10 without registering himself/herself in the information processing device 10.

FIG. 4(b) illustrates the acceptance screen for the license agreement. After confirming the details of the agreement, the user A sets the selection frame 150 to a display region indicating "Accept" and operates the select button of the input device 6. Upon receiving the operation of the select button, the reception section 110 supplies the operation information to the registration section 132. The registration section 132 displays a user registration screen on the output device 4.

FIG. 5(a) illustrates the user registration screen. User registration is performed by setting up local identification information (local ID) for uniquely identifying a user in the information processing device 10. Here, when the user A sets the selection frame 150 to a display region indicating "Next" and operates the select button of the input device 6, the reception section 110 receives an operation of the select button and supplies operation information to the registration section 132. The registration section 132 sets up a local ID for uniquely identifying the user A in the information processing device 10, registers the local ID in the user data holding section 138, and also displays an input screen for account information on the output device 4. When the registration section 132 has had the local ID stored in the user data holding section 138 during the series of registration work, the user A logs in to the information processing device 10.

FIG. 5(b) illustrates the input screen for the account information. The user A inputs, to the field of "Sign-in ID," the sign-in ID (e-mail address) that has already been registered in the server 5, and inputs, to the field of the "Password," the password that has already been registered in the server 5. When both the sign-in ID and the password are input, a display region indicating "Sign in" can be selected. The user A sets the selection frame 150 to the display region indicating "Sign in" and operates the select button of the input device 6. Then, the reception section 110 receives an operation of the select button and supplies operation information to the registration section 132.

The registration section 132 transmits, to the server 5, account information including the sign-in ID and the password. Authenticating that the account information transmitted matches the account information of the user A that has already been registered, the server 5 notifies the information processing device 10 of the result of authentication. Consequently, the management section 122 allows the user A to sign in to the server 5. At this time, the registration section 132 causes the user data holding section 138 to hold the account information of the user A in association with the local ID of the user A.

Thereafter, the registration section 132 displays, on the output device 4, various screens for performing, for example, setting of profile information including an icon or the like, privacy setting related to content, and setting regarding the relationship with a friend or a follower, and the user A may input various kinds of setting information. The registration section 132 registers such various kinds of setting information in the server 5 and causes the user data holding section 138 to hold such various kinds of setting information in association with the local ID of the user A. It is to be noted that, in a case where past, various kinds of setting information are registered in the server 5 and the user A hopes they be unchanged, the user data acquiring section 136 acquires, from the server 5, such past, various kinds of setting information as the user data of the user A, and causes the user data holding section 138 to hold such past, various kinds of setting information in association with the local ID of the user A.

The user A who logs in first to the information processing device 10 becomes a registered user of the information processing device 10 by registering his/her user data in the user data holding section 138 under the abovementioned procedures. By logging in to the information processing device 10, the user A can enjoy the application executed by the application execution section 140.

In conventional information processing devices, all users had to register their user data on the basis of the abovementioned registration procedures, at the time of logging in to the information processing device for the first time. However, this registration work had been burdensome for users who wanted to immediately start playing a game. As such, the information processing device 10 according to the embodiment realizes a mechanism by which a user who is to log in to the information processing device 10 second and subsequently can omit at least part of the registration procedure.

Figure 6:
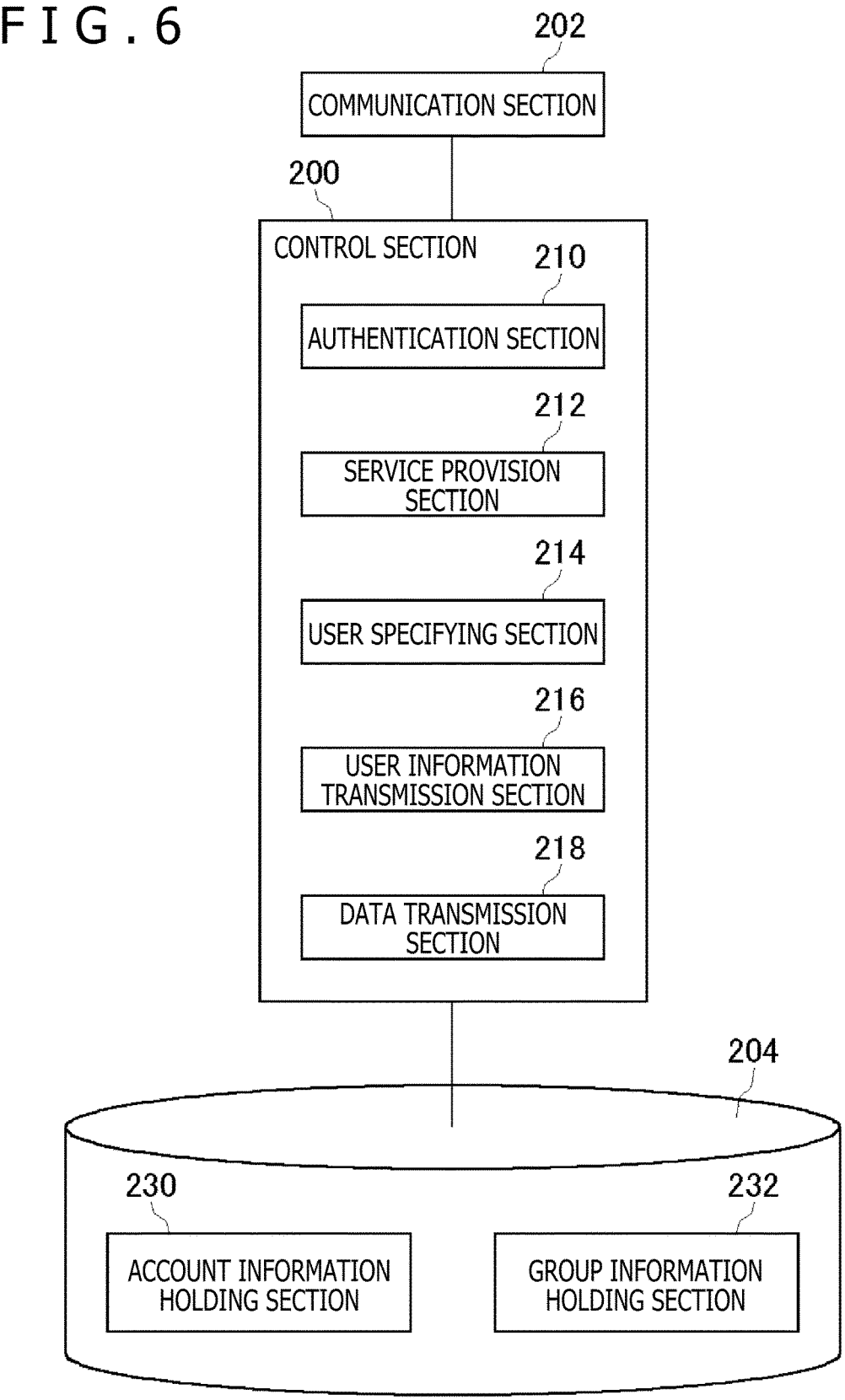
FIG. 6 is a diagram illustrating functional blocks of a server.

FIG. 6 illustrates functional blocks of the server 5. The server 5 includes a control section 200, a communication section 202, and a storage section 204. The control section 200 includes an authentication section 210, a service provision section 212, a user specifying section 214, a user information transmission section 216, and a data transmission section 218. The storage section 204 includes an account information holding section 230 and a group information holding section 232.

In FIG. 6, components described as functional blocks that perform various kinds of processing may be configured by a circuit block, a memory, or any other LSI, in terms of hardware, or may be implemented, for example, by a program loaded to the memory, in terms of software. Thus, it should be understood by those skilled in the art that these functional blocks can be implemented in various ways including hardware only, software only, or a composite configuration of the two; the way of implementing them is not limited to any of them. The service provision section 212 provides a network service to a user who has signed in to the server 5.

The account information holding section 230 holds combinations of sign-in IDs and passwords that constitute network accounts of plural registered users. The group information holding section 232 holds group information in which plural users that are grouped are associated with each other. In the embodiment, the group information holding section 232 stores group information in which plural users constituting a family group are associated with each other, but the group information holding section 232 may store group information in which plural users constituting a different kind of group are associated with each other.

The authentication section 210 checks the account information transmitted from the information processing device 10 with the account information held in the account information holding section 230. When the account information transmitted from the information processing device 10 matches the account information of the user A that is held in the account information holding section 230, the authentication section 210 authenticates that the user is the user A. Consequently, the management section 122 allows the user A to sign in to the server 5.

When the management section 122 has allowed the user A to sign in to the server 5 in the new registration work performed by the user A, the checking section 134 makes an inquiry to the server 5 as to whether there is a different user who is associated with the user A. In the server 5, the user specifying section 214 refers to the group information held by the group information holding section 232 and specifies a different user who is associated with the user A who has already signed in to the server 5. It is to be noted that, in a case where the user A does not belong to a family group or any other kind of group, a different user will not be specified. The user information transmission section 216 transmits, to the information processing device 10, information for identifying the different user who has been specified, for example, an online ID. It is to be noted that an online ID is a user ID that is to be used in the network service.

Here, in a case where the user A, the user B, and a user C are registered as members of a family group, the user information transmission section 216 transmits the online IDs of the user B and the user C to the information processing device 10. It is to be noted that information regarding a user who has signed in to the server 5 by using the new information processing device 10 in the past will not be transmitted by the authentication section 210 to the information processing device 10. For example, if the user C who is a family member has a past record of signing in to the server 5 by using the information processing device 10 prior to the user A, the user C is a registered user in the information processing device 10, and thus, the online ID of the user C is not transmitted to the information processing device 10. It is to be noted that, in the following description, the user B and the user C are assumed not to have any past record of signing in to the server 5 by using the information processing device 10. In the information processing device 10, the checking section 134 acquires pieces of information (online IDs) for identifying the user B and the user C who are associated with the user A.

FIG. 7 illustrates a registration screen for a family member. When the management section 122 has allowed the user A to sign in to the server 5 for the first time, the checking section 134 acquires, from the server 5, an online ID of a family member of the user A, and makes an inquiry to the user A as to whether or not the family member is to be registered in the information processing device 10. As illustrated in FIG. 7, established in the registration screen for family members are check boxes for selecting the user B and the user C who are family members of the user A but who are not yet registered in the information processing device 10.

When the user A approves the registration of the user B and the user C in the information processing device 10 with an intention to help the users B and C in subsequently logging in to the information processing device 10 in an easy manner, the user A checks the check boxes for the users B and C, sets the selection frame 150 to a display region indicating "Register," and operates the select button of the input device 6. When the reception section 110 receives an operation of the select button and supplies operation information to the checking section 134, the checking section 134 transmits, to the server 5, a request for acquisition of pieces of data regarding the users B and C.

In the server 5, the data transmission section 218 transmits, to the information processing device 10, various kinds of data including pieces of login data of the users B and C which have been requested for acquisition. The login data is data to be used in the screen that is used by a user to log in to the information processing device 10, and may include a user icon and an online ID. It is to be noted that, for the purpose of assisting the process of inputting account information of the users B and C, the data transmission section 218 may transmit, to the information processing device 10, the sign-in ID included in the account information.

In the information processing device 10, the user data acquiring section 136 may acquire pieces of data regarding the users B and C from the server 5 and cause the user data holding section 138 to hold such data. As described above, the pieces of data regarding the users B and C include the user icon and the online ID that are used in the login screen for selecting a user. By acquiring data regarding a different member of the family group from the server 5 and causing the user data holding section 138 to hold such data at the time when the user A signs in to the server 5 from the information processing device 10 for the first time, the information processing device 10 allows the users B and C to log in to the information processing device 10 in a simple and easy manner at the time of operating the information processing device 10 for the first time.

The procedure used when the user B logs in to the information processing device 10 is described. When the user B operates a predetermined button of the input device 6, the information processing device 10 and the input device 6 are connected, and the login screen generation section 124 displays, on the output device 4, a login screen for selecting a user.

FIG. 8 illustrates an example of the login screen. On the login screen, users registered in the information processing device 10 are displayed in a selectable manner. It is to be noted that, when the user B selects a display region indicating "New user," an input screen for registering the user B himself/herself in the information processing device 10 on the basis of the new registration procedure illustrated in FIGS. 4 and 5 is displayed.

The login screen generation section 124 uses pieces of data regarding registered users held in the user data holding section 138 and displays, on the output device 4, a login screen including information regarding the user A, information regarding the user B, and information regarding the user C in a selectable manner. When the user B operates the information processing device 10 for the first time, the user B is displayed on the login screen as already being selectable. When the user B selects the information regarding the user B displayed on the login screen, the management section 122 allows the user B to log in to the information processing device 10. As a result, the user B can select his/her icon and easily log in to the information processing device 10, without the need to select the display region indicating "New user" and register himself/herself in the information processing device 10.

It is to be noted that, although the user B can log in to the information processing device 10, the user B cannot automatically sign in to the server 5 since the account information of the user B is not registered in the user data holding section 138. In a case where the user B needs to sign in to the server 5, the registration section 132 displays, on the output device 4, an input screen for the account information.

FIG. 9 illustrates an input screen for the account information. Since the sign-in ID of the user B is already held in the user data holding section 138, the sign-in ID (e-mail address) of the user B is automatically input to the field of the "Sign-in ID." The registration section 132 displays the input screen for the account information, in a state in which the field of "Password" to which a password is to be input when the user B signs in to the server 5 is blanked out. As a result, the user B is allowed to sign in to the server 5, only by inputting the password.

The present invention has been described above on the basis of an embodiment. This embodiment is an example, and it should be understood by those skilled in the art that various modifications can be made with respect to the combination of the components and processes and that those modifications also fall within the scope of the present invention. In the embodiment, the server 5 has been described to manage a family group including a family, but the server 5 may manage another kind of group.

The server 5 can recognize, by the device ID, the information processing device used by a user. In such a case, the server 5 may identify the device ID of the information processing device used by a user and may group users who are sharing one information processing device. In many cases, it is expected that plural users sharing one information processing device constitute a family and also similarly share one information processing device when the information processing device is renewed. Thus, even in a case where a family group is not registered, group information in which plural users sharing one information processing device are associated with each other may be managed.

In the embodiment, the user has been described to sign in to the server 5 by inputting the sign-in ID (e-mail address as one example) and a password, but the means for signing in to the server 5 is not limited to authentication using a combination of the sign-in ID and password. For example, when a user signs in to the server 5, a QR code (registered trademark) in which a passcode is embedded or a one-time personal identification number (PIN) code may be displayed on the output device 4, to allow the user to sign in to the server 5 by reading the displayed code with use of a dedicated app installed in a mobile terminal device such as a smartphone. Further, the abovementioned code may be transmitted to the mobile terminal device of the user to allow the user to read the displayed code by a dedicated app and sign in to the server 5. As described above, in the information processing system 1, the user may sign in to the server 5 by various kinds of means.

INDUSTRIAL APPLICABILITY

The present invention can be used for a technology for allowing a user to log in to an information processing device.

REFERENCE SIGNS LIST

1: Information processing system
10: Information processing device
100: Processing section
102: Communication section
110: Reception section
120: Login processing section
122: Management section
124: Login screen generation section
130: User registration processing section
132: Registration section
134: Checking section
136: User data acquiring section
138: User data holding section
140: Application execution section
150: Selection frame
200: Control section
202: Communication section
204: Storage section
210: Authentication section
212: Service provision section
214: User specifying section
216: User information transmission section

218: Data transmission section
230: Account information holding section
232: Group information holding section

The invention claimed is:

1. An information processing device that connects to a server, comprising:
processing circuitry configured to
allow a first user to sign in to the server,
in a case that the first user is authenticated, receive a selection from the first user whether or not a second user is to be registered in the information processing device,
in a case that the first user approves registration of the second user, acquire, from the server, data regarding a second user who is associated with the first user in the server but who is not yet registered in the information processing device, the acquired data regarding the second user including login data,
store data regarding the first user and the data regarding the second user, and
display a login screen including information regarding the first user and information regarding the second user.

2. The information processing device according to claim 1, wherein,
when the second user selects the information regarding the second user that is displayed on the login screen, the management section allows the second user to log in to the information processing device.

3. The information processing device according to claim 2, further comprising:
a registration section that displays, after the second user has logged in to the information processing device, an input screen to which a password that is used when the second user signs in to the server is to be input.

4. A server that connects to an information processing device, comprising:
processing circuitry configured to
hold group information in which plural users are associated with each other;
receive, from the information processing device, a selection of a different user from the group information who is associated with a user who has already signed in to the server; and
in response to the received selection of the different user, transmit, to the information processing device, login data of the different user.

5. A non-transitory computer-readable storage medium, storing computer-readable instructions thereon which, when executed by a computer that connects to a server, cause the computer to perform a method, the method comprising:
allowing a first user to sign in to the server;
in a case that the first user is authenticated, receiving a selection from the first user whether or not a second user is to be registered in the information processing device;
in a case that the first user approves registration of the second user, acquiring, from the server, data regarding a second user who is associated with the first user in the server but who is not yet registered in the computer, the acquired data regarding the second user including login data; and
displaying a login screen including information regarding the first user and information regarding the second user.

* * * * *